United States Patent
Holt

[15] 3,657,566
[45] Apr. 18, 1972

[54] ALTERNATING CURRENT TO DIRECT CURRENT SIGNAL CONVERTER

[72] Inventor: Frederick Rodney Holt, Manhattan, N.Y.
[73] Assignee: The Hickok Electrical Instrument Company, Cleveland, Ohio
[22] Filed: May 13, 1970
[21] Appl. No.: 36,892

[52] U.S. Cl. ................................ 307/260, 328/26, 321/8, 307/237
[51] Int. Cl. ................................................ H03k 5/00
[58] Field of Search .............. 321/8, 45; 307/260, 237, 205, 307/221, 251, 279, 304; 328/26

[56] References Cited

UNITED STATES PATENTS

| | | | |
|---|---|---|---|
| 3,426,210 | 2/1969 | Agin | 307/260 |
| 3,449,725 | 6/1969 | Eckelkamp et al. | 307/260 |
| 3,489,925 | 1/1970 | Bjerke | 307/260 |
| 3,069,559 | 12/1962 | Chaplin et al. | 307/260 |
| 3,250,918 | 5/1966 | McGrogan, Jr. | 307/260 |
| 3,288,930 | 11/1966 | Johnson | 307/260 |
| 3,317,743 | 5/1967 | Rogers | 307/260 |
| 3,482,169 | 12/1969 | Peterson | 307/260 |
| 3,493,784 | 2/1970 | Brolin | 307/260 |
| 3,497,814 | 2/1970 | Mont | 307/260 |
| 3,519,550 | 7/1970 | Winslow et al. | 307/260 |

Primary Examiner—Donald D. Forrer
Assistant Examiner—R. E. Hart
Attorney—Baldwin, Egan, Walling & Fetzer

[57] ABSTRACT

A converter for converting an alternating current signal to a corresponding direct current signal and which has a differential input stage connected to the input of class A amplifier. The amplifier has a shorting circuit connected between its input and a converter circuit therein which converts a voltage signal swing at the amplifier output into a current signal swing and which provides a "zero summing point" or circuit whereby the direct current output signal may be referenced directly to the converter ground, and also wherein the said output is directly related to the input signal current.

4 Claims, 1 Drawing Figure

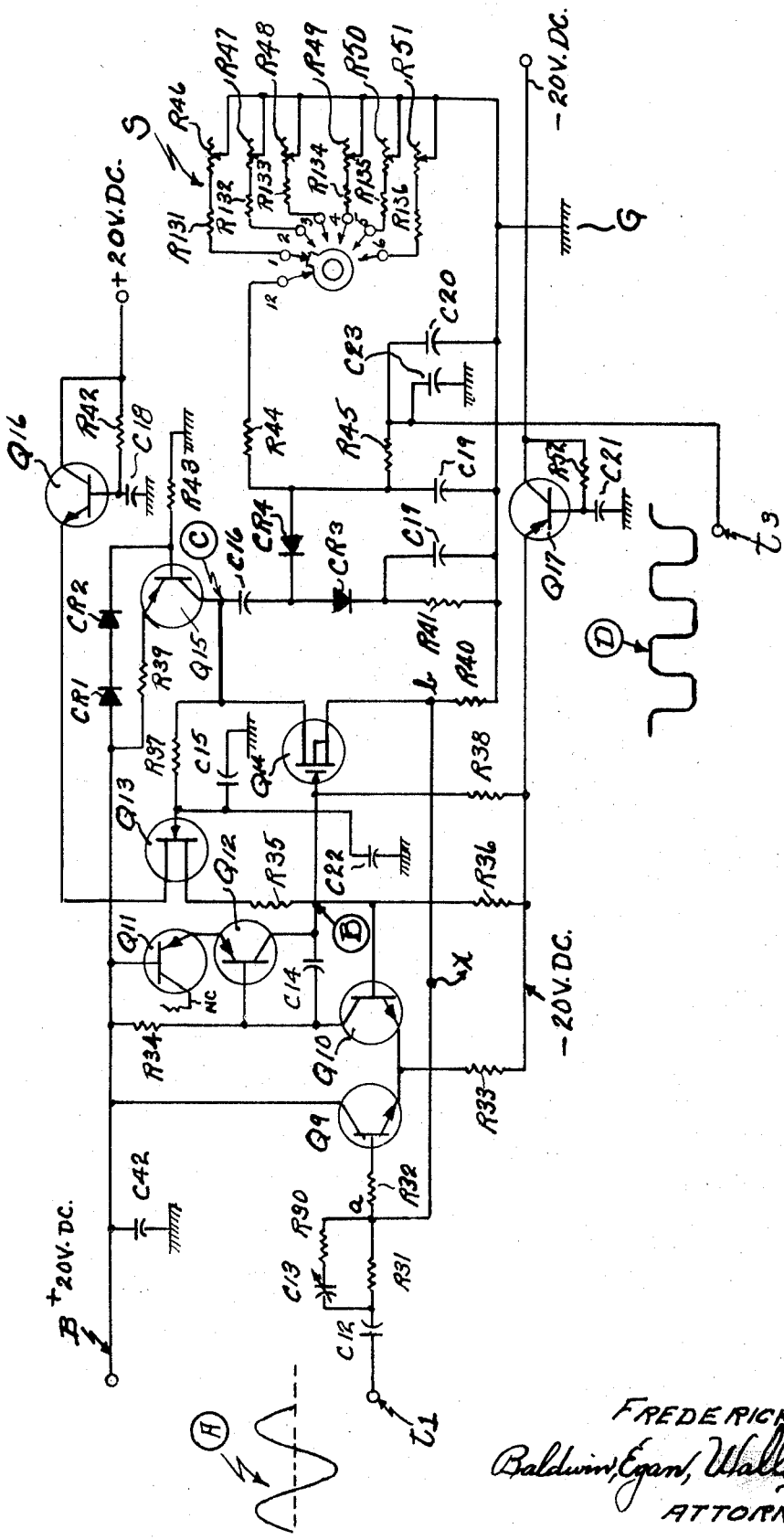

ALTERNATING CURRENT TO DIRECT CURRENT SIGNAL CONVERTER

This invention relates to a new and novel converter especially designed to convert an alternating current signal into a corresponding direct current signal and wherein the direct current signal is directly related to the converter ground and also to the input alternating current signal.

It is therefore a primary object of the present invention to provide a converter for converting an alternating current signal into a corresponding direct current signal.

Another object of the present invention is to provide a converter as defined and which includes circuitry for converting a voltage signal into a current signal and shorting circuitry which connects said converting circuitry to the input of the converter whereby to define a zero summing point or circuit, and an output circuit connected to said converting circuitry to separately accept positive and negative current signals each being referenced to the converter ground.

Additional objects and advantages of the converter of the present invention will be apparent to one skilled in the art to which it pertains and upon reference to the following disclosure of a preferred embodiment thereof and which is illustrated in the accompanying schematic wiring diagram.

With reference now directed to said circuit diagram, the converter of the present invention is identified in its entirety at 10 and is seen to be connected to two sources of direct current energy (not shown) which may be of any conventional source sufficient to provide ±20 volts DC.

The converter 10 includes a differential input stage comprising of transistors Q9 and Q10 connected to said sources of energy.

The base of transistor Q9 is shown connected by a capacitive coupling network including capacitors C12, C13, and resistors R30, R31 to the signal input terminal $t1$.

The values of the components of said coupling network, as well as the specifications of the remaining associated components utilized in the present converter, are hereinafter tabulated, and are illustrative of merely one embodiment of converter system.

The converter of the present invention is especially designed to convert an alternating current signal which has the general configuration that is shown at (A) in the drawing and which may be of any selected magnitude such as for example 2 volts AC.

The collector of transistor Q10 of said differential circuit is connected directly to the base of transistor Q12 which, with its associated amplifier circuitry operates as a class A amplifier, i.e., with transistor Q11 operating to provide bias for the emitter of transistor Q12, and MOS FET transistor Q13 connecting at its source to the base of transistor Q10 and at its drain electrode to voltage regulator Q16 to thereby provide DC feedback to the differential input stage of said amplifier. A second voltage regulator Q17 is connected into the amplifier circuitry to provide the aforesaid −20 volt DC energy to the same.

With this circuitry said amplifier Q12 operates in its linear range and, as aforesaid, also as a class A amplifier whereby to provide an amplified output signal at the collector of Q12 identified as point (B) which signal is substantially identical to the configuration of the input signal at (A).

The collector of transistor Q12 is connected directly to the gate of the MOS FET transistor Q14. The drain of said transistor Q14 is coupled by capacitor C16 to the juncture of diodes CR3 and CR4 which are connected at said point in opposed relation to each other whereby the negative-going portion of the output current signal from the drain of Q14 passes through diode CR4 and the positive-going part of said current signal passes through diode CR3.

As shown in the drawing, the anode of CR3 is connected to the converter ground G through the RC network comprising resistor R41 and capacitor C17.

The cathode of diode CR4 is connected to one end of resistors R44 and R45 which are seen to be connected in parallel. The opposite end of resistor R44 is connected to a stationary contact (12) of a rotary range switch S, said contact being in constant communication with the rotary contact of said switch.

The associated stationary contacts numbered 1-6 of said switch S are each shown connected to one end of a fixed resistance and variable resistance serially connected together, the opposite end of which is connected to the converter ground G. For example, stationary contact 1 of said switch is shown connected to one end of resistor R131, the opposite end of which is connected to one end of variable resistor R46, the adjustable arm of which is connected to said ground G.

The AC/DC converter of this invention is designed to receive an alternating current voltage signal input such as illustrated at (A) in the drawing which may vary linearly from 0 to 2 volts RMS.

The range switch S, as shown, has six active positions, one of said positions as illustrated wherein stationary contact (12) and stationary contact (1) are in circuit to connect resistors R131 and R46 to the output of transistor Q14. Likewise, with the rotary contact of said switch rotated clockwise successively to the next five switch positions, stationary contact 12 is successively connected in circuit with switch contacts 2–6 whereby to connect the resistor series circuit associated therewith to the output of transistor Q14.

The drain electrode of transistor Q14 is also connected to the collector of a stiff current generator Q15 called a constant current generator.

In its operative condition, as will be more fully apparent hereinafter, the transistor Q14 converts the voltage swing at the output of the amplifier (point B or gate of Q14) into a current swing.

The illustrated embodiment of the AC/DC converter is intended to operate with a wide-band amplifier of the type disclosed and claimed in my copending application Ser. No. 36,977 entitled Wide Band Direct Current Coupled Amplifier for Alternating Current Utility, which amplifier is capable of operating over a voltage range between 0 – 1,000 volts in six operational levels as identified in said copending application.

In each range of operation, the output voltage as is illustrated at (A) in the drawings of this specification and which is the input voltage signal to the converter herein may vary linearly in magnitude from 0 to 2 volts RMS.

And, the amplified voltage signal as it appears at point (C) likewise will correspondingly vary linearly approximately in the range from 0 to 5 volts.

The range switch S is intended to be actuated selectively to one of its six positions when used with said wide-band amplifier to provide a pre-calibrated load for the AC/DC converter so that the same operates in its linear region.

A unique feature of the AC/DC converter of this invention is the short circuit connection identified at X which is connected between the source electrode of transistor Q14 and the juncture point of resistors R31 and R32 which connects to the base of transistor Q9.

This short circuit connection X may also be referred to as the sum to zero point or connection.

In its operation the amplifier (Q9, Q10, Q12 and Q13) and associated circuitry is a nominal 100 db. voltage amplifier. The DC feedback to the differential input stage Q9, Q10 via transistor Q13 forces the operating point at output (C) to be nominally 8 volts. As aforesaid, transistor Q15 functions as a stiff current source or constant current generator at the drain of Q14, and Q14 converts the voltage swing at the output of A2 into a current swing. The change in current at the drain of Q14 is exactly equal to the change in current of the input signal. By conventional high gain operational amplifier theory the voltage swing across resistor R40 is negligibly small, consequently, the current swing at the output (C) is exactly equal to the input current.

This is accomplished by reason of the following.

Considering the input signal that is applied at point (A), the signal current thereof $I_{signal}$ is equal to $E_{signal}/R31$.

The amplifier (Q9, Q10, Q12 and Q13) has negligible loading as will be understood upon comparing the amplifier circuitry, the components utilized therein and their respective magnitudes.

Therefore, the signal current (I signal) flows through the short circuit connection X(zero summing point) from (a) to (b). As seen in the schematic drawing, point (b) connects at one end of resistor R40, and since the zero summing point is (a and b), the signal current $I_{signal}$ which flows through R40 is negligible and can be considered to be approximately zero.

Consequently, the signal current $I_{signal}$ flowing from point (a to b) zero summing point will then flow through the transistor Q14 inasmuch as the amplifier has negligible loading, as aforementioned.

And, likewise since the current generator generator Q15 is a "stiff generator or constant current source," $I_{signal}$ does not flow therethrough.

As a result therefore, all of the signal current ($I_{signal}$) flows through transistor Q14 and capacitor C16 to the rectifying circuit.

The positive-going portion of the signal current then passes through diode CR3 and resistor R41 whereby it is referenced to ground G. In like manner, the negative-going portion of the signal current is passed through diode CR4, resistor 45 and conductor 50 to output terminal t3.

In the circuit embodiment disclosed herein, the positive-going portion of the output signal is referenced through resistor R41 to the converter ground G, and the negative-going portion thereof is used as the output DC signal at terminal T3; however, as will be understood, either the positive or negative-going portion of said signal could be referenced to ground G and the remaining portion utilized as said output DC signal.

This output signal current is filtered to its average value and multiplied by the voltage gain control series resistive combination of resistor R44 and associated series combination of gain control resistors that is selected by range switch S to provide an output voltage signal $E_{out}$ which has a waveform that is shown at (D).

The advantages of this current conversion technique over conventional voltage converters are two-fold. First of all, insofar as the output (C) can provide the necessary voltage swing, which, in turn provides the current to the gain control resistive network, the reactance of coupling capacitor C16 does not enter into the overall gain calculation. Secondly, the high gain amplifier and current mode switching yields minimum error due to the forward voltage drop and recovery time of the rectifying diodes CR3 and CR4.

The RMS to average DC voltage gain equation is:

$$E_{out}(\text{Av. D.C.}) = \frac{(-)E_{in\ rms}(R_o)K}{R_{in}}$$

where:
$E_{in\ rms}$ is the input voltage signal at (A).
$R_o$ is the resistor R44 and the series combination of resistors connected to R44 by range switch S.
K = rms to DC conversion factor or (0.453).
$R_{in}$ is the input resistor R31.

The following is a table of the components and their values that are disclosed herein:

| Component Reference | Specification |
|---|---|
| C12 | Capacitor, Fixed Alumalytic: 100 μF, 25 volts |
| C13 | Capacitor, Variable: trimmer, 5–25 pF |
| C14 | Capacitor, Fixed, Dipped Mica: 27 pF, 5%, 500 volts |
| C15 | Capacitor, Fixed, Metallized Polyester Film: 0.27 μF, 10%, 200V |
| C16 | Capacitor, Fixed, Alumalytic: 47 μF, 25 volts |
| C17 | Capacitor, Fixed, Metallized Polyester film: 6.8 μF, 10%, 100V |
| C18 | Capacitor, Fixed, Electrolytic: 80 μF, 25 volts |
| C19 | Same as C17 |
| C20 | Capacitor, Fixed, Metallized Polyester Film: 2.2 μF, 10%, 100V |
| C21 | Same as C18 |
| C22 | Capacitor, Fixed, Metallized Polyester Film: 1.0 μF, 10%, 63V |
| C23 | Same as C16 |
| Q9, Q10 | Transistor: 2N3904 |
| Q11 | Semiconductor Device, Diode |
| Q12 | Transistor: 2N3906 |
| Q13 | Transistor: N Channel FET, TIS88 |
| Q14 | Transistor: modified |
| Q15 | Transistor: 2N4888 |
| Q16 | Transistor: selected, 2N3566 |
| Q17 | Transistor: 2N3644 |
| R30 | Resistor, Fixed, Metal Oxide: 56K ohms, 5%, ½ watt |
| R31 | Resistor: value to be determined in calibration |
| R32 | Resistor, Fixed, Composition: 68 ohms, 10%, ¼ watt |
| R33 | Same as R28 |
| R34 | Same as R13 13 |
| R35 | Resistor, Fixed, Composition: 10K ohms, 10%, – watt |
| R36 | Resistor, Fixed, Composition: 22K ohms, 10%, ¼ watt |
| R37 | Resistor, Fixed, Composition: 5.6 megohms, 10%, ¼ watt |
| R38 | Resistor, Fixed, Composition: 39K ohms, 10%, ¼ watt |
| R39 | Resistor, Fixed, Metal Film: 0.100 ohms, 1%, ½ watt |
| R40 | Resistor, Fixed, Composition: 150 ohms, 10%, ¼ watt |
| R41 | Resistor, Fixed, Composition: 1.8K ohms, 10%, 174 watt |
| R42 | Resistor, Fixed, Composition: 1.2K ohms, 10%, ¼ watt |
| R43 | Resistor, Fixed, Composition: 18K ohms, 10%, ¼ watt |
| R44 | Resistor, Fixed, Metal Film: 1.74K ohms, 0.5%, ½ watt |
| R45 | Resistor, Fixed, Metal Film: 10K ohms, 1%, ½ watt |
| R46 through R51 | Resistor, Variable: wire wound, 50 ohms, 20%, 2 watt |
| R52 | Resistor, Fixed, Composition: 1,000 ohms, 10%, ¼ watt |
| R131 through R136 | Resistor: value to be determined in calibration |

Having thus described a preferred embodiment of AC/DC converter of the present invention, it will be apparent that the inventive concepts thereof are susceptible to various changes and modifications without departing from the scope thereof as is defined in the claims.

What is claimed is:

1. An AC TO DC converter comprising input circuit means for receiving an alternating current signal, voltage amplifier means connected to said input circuit means for amplifying said alternating current signal, signal converter means connected to said amplifier means for converting the voltage swing of the alternating current signal to an alternating signal current having a current swing, a short circuit connection between said input circuit means and said output circuit means to define a zero summing point therebetween whereby the signal current of said alternating current signal is applied to said signal converter means, current generator means connected to said output circuit means and classified as a stiff current source, rectifying circuit means connected to said output circuit means and operable to separately pass the positive-going and negative-going portions of the alternating current signal from said output circuit means, a ground reference for said converter, and said rectifying circuit means being connected to said ground reference whereby to relate said alternating current signal from said output circuit means to said ground reference.

2. An AC to DC converter as is defined in claim 1 and wherein the positive-going portion of the alternating current signal from the signal converter means is referenced to the converter ground.

3. An AC to DC converter as is defined in claim 1 and wherein the negative-going portion of the alternating current signal from the signal converter means is referenced to the converter ground.

4. An AC to DC converter as is defined in claim 1 and wherein the signal converter means includes transistor means wherein the change in the output current signal therefrom is exactly equal to that of the alternating current signal applied to the input circuit means.

* * * * *